(12) United States Patent
Arbel

(10) Patent No.: US 12,346,585 B2
(45) Date of Patent: Jul. 1, 2025

(54) MEMORY CONTROLLER TO PERFORM IN-LINE DATA PROCESSING AND EFFICIENTLY ORGANIZE DATA AND ASSOCIATED METADATA IN MEMORY

(71) Applicant: XILINX, INC., San Jose, CA (US)

(72) Inventor: Ygal Arbel, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 13 days.

(21) Appl. No.: 17/974,084

(22) Filed: Oct. 26, 2022

(65) Prior Publication Data
US 2024/0143206 A1    May 2, 2024

(51) Int. Cl.
*G06F 3/06* (2006.01)
(52) U.S. Cl.
CPC ............ *G06F 3/064* (2013.01); *G06F 3/0622* (2013.01); *G06F 3/0658* (2013.01); *G06F 3/0679* (2013.01)
(58) Field of Classification Search
CPC ...... G06F 3/064; G06F 3/0622; G06F 3/0658; G06F 3/0679
USPC ........................................................ 711/154
See application file for complete search history.

(56) References Cited

U.S. PATENT DOCUMENTS

| | | | |
|---|---|---|---|
| 8,266,368 B2* | 9/2012 | Shiraishi ............ | G06F 13/1647 711/103 |
| 10,509,581 B1* | 12/2019 | Abrol .................... | G06F 3/0688 |
| 2006/0069851 A1* | 3/2006 | Chung ............... | G06F 13/1668 714/E11.04 |
| 2017/0031936 A1* | 2/2017 | Bowman .............. | G06F 3/0644 |
| 2020/0034079 A1* | 1/2020 | Li ......................... | G06F 3/0656 |
| 2020/0241750 A1* | 7/2020 | Kanno ................. | G06F 3/0614 |
| 2022/0100425 A1* | 3/2022 | Ryu ..................... | G06F 3/0659 |
| 2022/0148670 A1* | 5/2022 | Lee ....................... | G11C 29/52 |

* cited by examiner

*Primary Examiner* — Kenneth M Lo
*Assistant Examiner* — Jonah C Krieger
(74) *Attorney, Agent, or Firm* — Patterson + Sheridan, LLP

(57) ABSTRACT

Embodiments herein describe a memory controller that performs in-line data processing (e.g., cryptography and error correction) and efficiently organizes data and associated metadata in memory. The memory controller generates a data block that includes a processed (e.g., encrypted) dataset and associated metadata (e.g., cryptographic metadata and ECC), and stores the data block in a block of memory (i.e., rather than storing the metadata separately), to minimize a number of access operations. The memory controller may access memory in segments (e.g., BL16 operations) that are smaller than the data blocks. For linear accesses, the memory controller may cache a portion of a data block until a subsequent access operation.

18 Claims, 7 Drawing Sheets

MEMORY CONTROLLER TO PERFORM IN-LINE DATA PROCESSING AND EFFICIENTLY ORGANIZE DATA AND ASSOCIATED METADATA IN MEMORY

TECHNICAL FIELD

Examples of the present disclosure generally relate to a memory controller that performs in-line data processing and efficiently organizes data and related metadata in memory.

BACKGROUND

When data is to be stored in memory, cryptographic circuitry may first encrypt the data and error correction code (ECC) circuitry may compute an ECC (collectively referred to as pre-processing). A memory controller then stores the encrypted user data in memory. In response to a read request, the memory controller retrieves the encrypted user data from memory, the ECC circuitry checks the retrieved encrypted user data based on the computed ECC and makes any needed corrections, and the cryptographic circuitry decrypts the user data based on cryptographic metadata (collectively referred to as post-processing).

There is an ongoing need to refine pre-processing, post-processing, and memory storage/arrangement techniques, such as to improve efficiency, increase bandwidth, and/or reduce power consumption.

SUMMARY

Examples of the present disclosure generally relate to a memory controller that performs in-line data processing (e.g., cryptography and error correction code computation) and efficiently organizes data and related metadata in memory.

One example described herein is memory access control circuitry that includes data processing circuitry that performs multiple processes on a first dataset to provide a first data block that includes a processed dataset and multiple respective sets of metadata, and memory interface circuitry that writes the first data block to a first block of memory and retrieves the first data block from the first block of memory, where the data processing circuitry recovers the first dataset from the processed dataset retrieved from the first block of memory based on the multiple sets of metadata retrieved from the first block of memory.

Another example described herein is an integrated circuit (IC) device that includes memory cells and memory access control circuitry, where the memory access control circuitry includes data processing circuitry that performs multiple processes on a first dataset to provide a first data block that includes a processed dataset and multiple respective sets of metadata, and memory interface circuitry that writes the first data block to a first block of the memory cells and retrieves the first data block from the first block of the memory cells, where the data processing circuitry recovers the first dataset from the processed dataset based on the multiple sets of metadata.

Another example described herein is method that includes performing multiple processes on a first dataset to provide a first data block that includes a processed dataset and multiple respective sets of metadata, writing the first data block to a first block of memory, retrieving first data block, including the first dataset and the multiple sets of metadata, from the first block of memory, and recovering the first dataset from the processed dataset retrieved from the first block of memory based on the multiple sets of metadata retrieved from the first block of memory.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
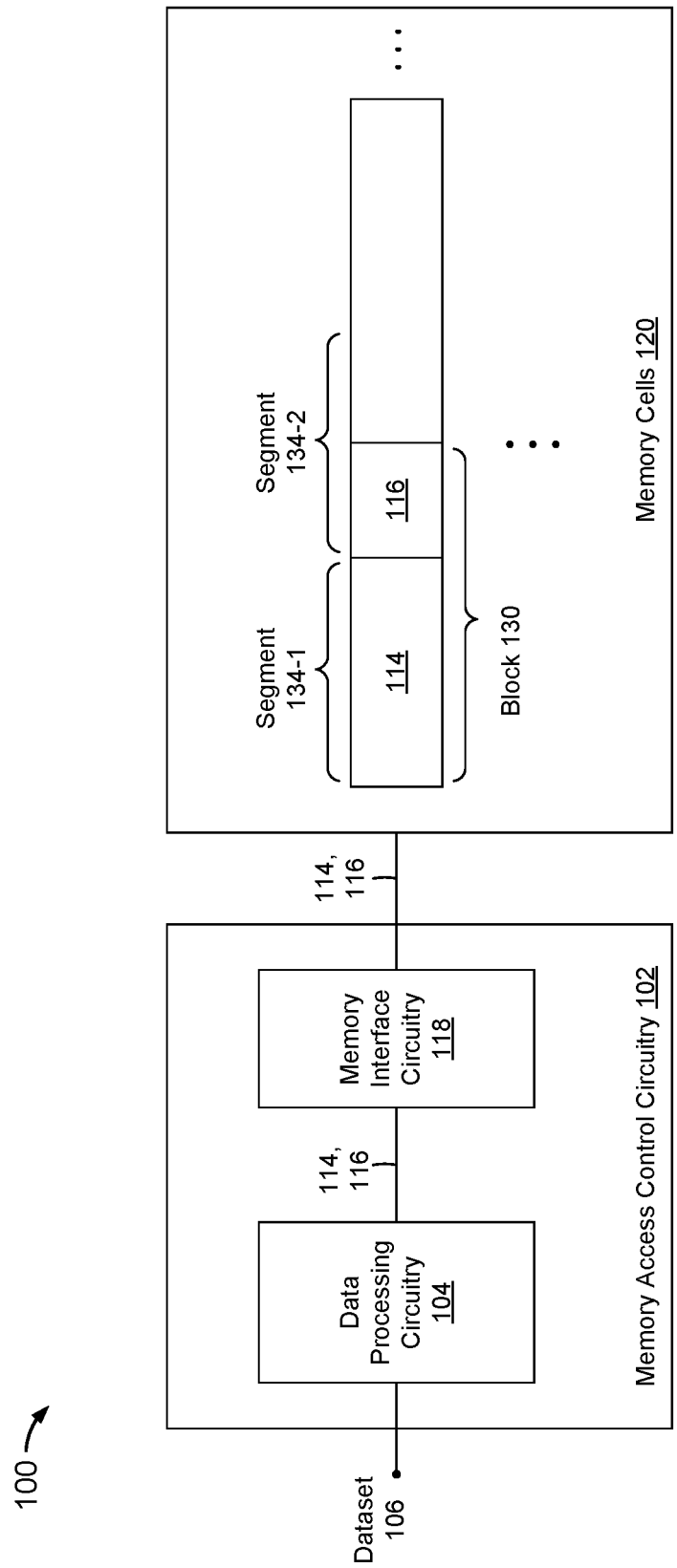
FIG. 1 is a block diagram of a memory system that includes memory access control circuitry having data processing circuitry and memory interface circuitry, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples of the present disclosure generally relate to a memory controller that performs in-line data processing (e.g., cryptography and error correction code computation) and efficiently organizes data and related metadata in memory.

Embodiments herein describe a memory controller that combines in-line data processing (e.g., cryptography and error correction code computation) with optimized/efficient memory organization (e.g., storing encrypted user data and associated encryption metadata and error correction codes in a tightly packed arrangement). The optimized memory organization may be useful to minimize access operations.

Embodiments herein further describe a specialized cache, which may be useful to further improve performance, efficiency, and/or available user bandwidth. For example, the memory controller may access memory in segments (e.g., BL16 operations) that are smaller than the data blocks. For linear accesses, the memory controller may cache a portion of a data block until a subsequent access operation. The specialized cache may further minimize access operations.

Embodiments herein may be useful to improve performance, efficiency, and/or available user bandwidth.

Embodiments herein may be useful to provide concurrent use of encryption and error correcting codes (ECCs), such as in critical use applications.

Embodiments herein may utilize relatively few memory access commands per user command (i.e., per user-initiated memory access request) for a variety of memory access traffic patterns.

Embodiments herein may improve data access efficiency and data locality (e.g., same page access in many situations). Benefits provided by techniques disclosed herein may translate to higher user-visible bandwidth and lower power consumption.

FIG. 1 is a block diagram of a memory system 100, according to an embodiment. Memory system 100 includes memory access control circuitry 102 and memory cells 120. Memory access control circuitry 102 includes data processing circuitry 104 and memory interface circuitry 118. Memory interface circuitry 118 may perform one or more of a variety of functions such as, without limitation, memory mapping, arbitration, scheduling, and/or command generation.

Figure 2:
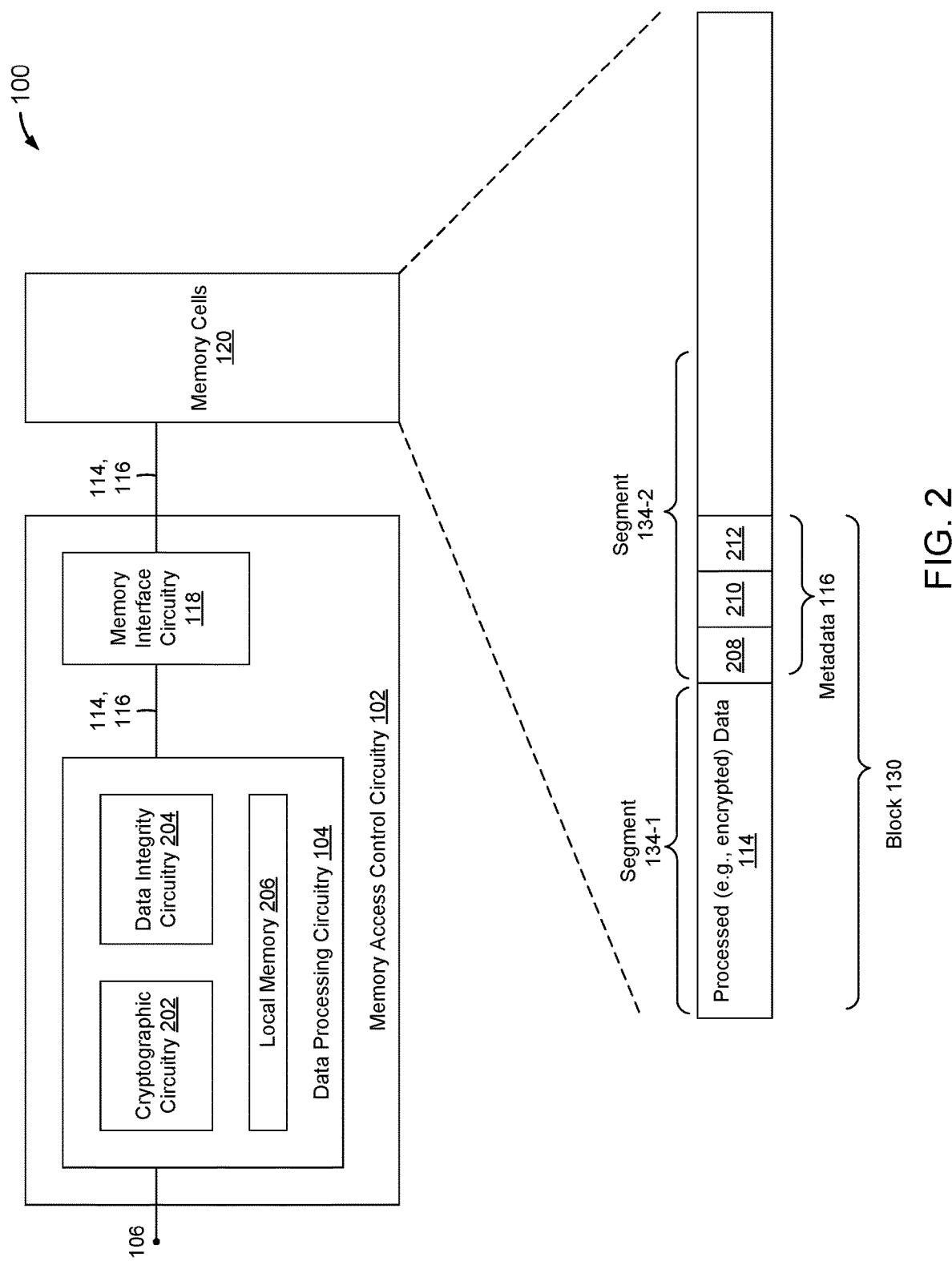
FIG. 2 is block diagram of the memory system in which the data processing circuitry performs multiple processes on a dataset to generate multiple respective sets of metadata, according to an embodiment.

FIG. 2 is block diagram of memory system 100 in which data processing circuitry 104 includes cryptographic circuitry 202 and data integrity circuitry 204, according to an embodiment. Data processing circuitry 104 may further include local memory 206.

Figure 3:
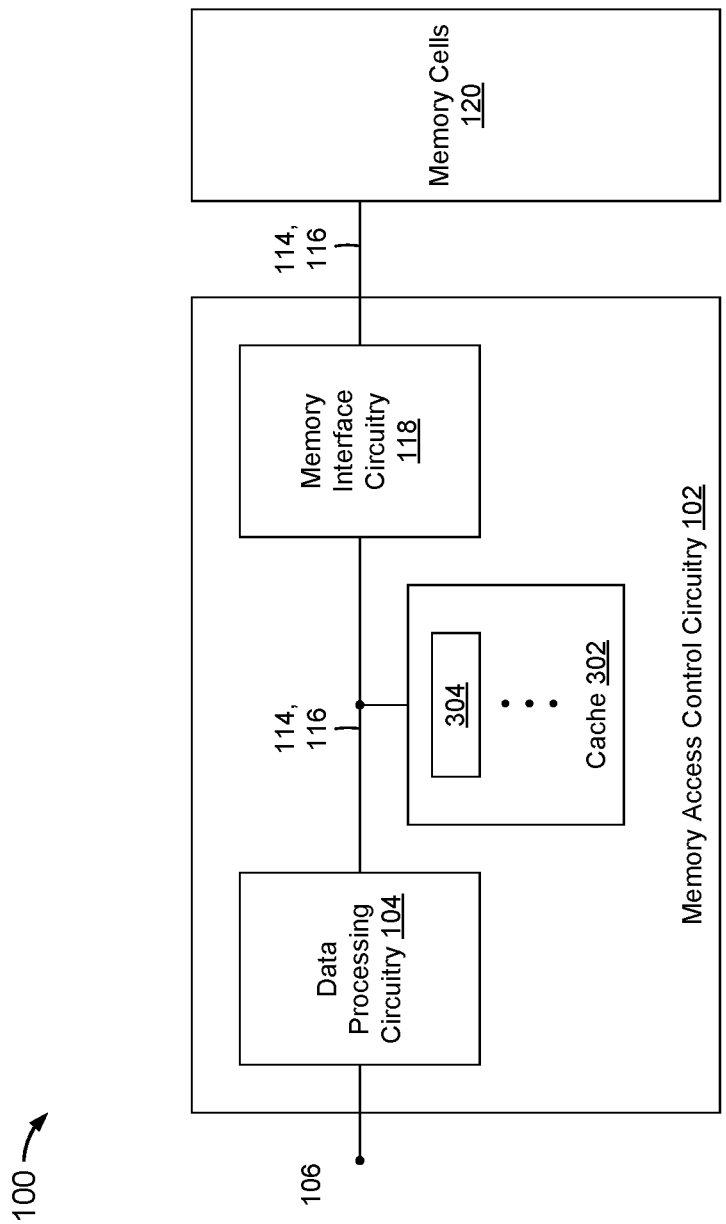
FIG. 3 is block diagram of the memory system in which the memory access control circuitry further includes a cache, according to an embodiment.

FIG. 3 is block diagram of memory system 100 in which memory access control circuitry 102 includes a cache 302, according to an embodiment. Cache 302 may be useful for linear access of memory cells 120, such as described in examples below. Cache 302 includes one or more cachelines 304 (e.g., between 32 and 64 cache lines), The number of cache lines 304, or cacheline count, may be configurable.

Cache 302 may retain contents of a cacheline until a new cacheline is needed, at which point cache 302 may use an eviction policy (e.g., least recently used (LRU)) to select a cacheline for eviction. Retaining a cacheline may provide little if any benefit since linear traffic will immediately use the cacheline, while random traffic will rarely, if ever, use the cacheline. Alternatively, cache 302 may support 'pop' operations in which a cacheline is evicted immediately after the cacheline is read and no memory write-back. Immediate eviction may improve locality of writes, which may improve efficiency. Cache 302 may use dirty line evict with memory write back (using partial write). Cache 302 may support software-controlled cache flush. Cache lines 304 may be protected such as with EEC and/or parity checks, such as for functional safety purposes.

In some situations, short random transactions may be more efficient without cache. Memory access control circuitry 102 may analyze and classify traffic type and dynamically disable cache 302 for certain traffic types, such as relative short random traffic. Alternatively, or additionally, memory access control circuitry 102 may include a static user-selectable option to disable cache 302.

Figure 4A:
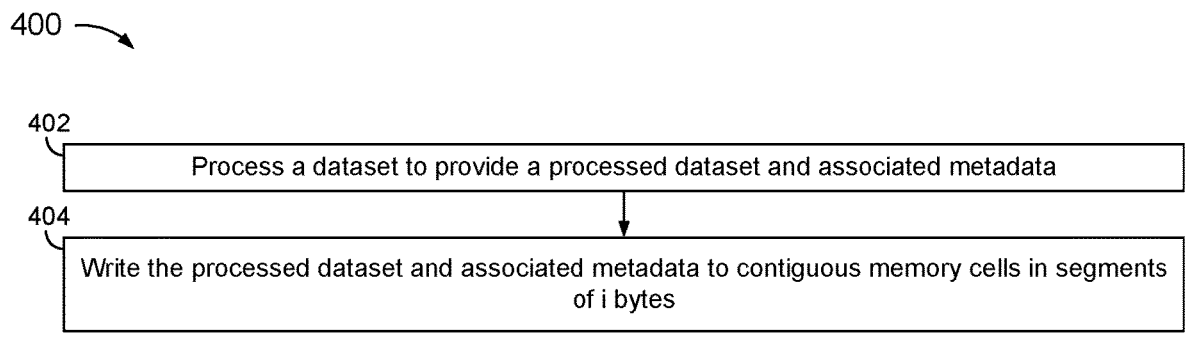
FIG. 4A is a flowchart of a method of writing to memory, according to an embodiment.

FIG. 4A is a flowchart of a method 400 of writing to memory, according to an embodiment. Method 400 is described below with reference to memory system 100. Method 400 is not, however, limited to the example of memory system 100.

At 402, data processing circuitry 104 processes a dataset 106 to provide a block of data (block) 130 that includes processed dataset 114 and associated metadata 116. Memory system 100 may receive dataset 106 as part of a write request.

In FIG. 2, cryptographic circuitry 202 encrypts dataset 106 to provide processed dataset 114 as an encrypted dataset, and generates associated cryptographic metadata 208. Cryptographic circuitry 202 may comply with one or more standards and/or may support one or more modes of operation such as, without limitation, an Advanced Encryption Standard (AES) and/or a Galois/Counter Mode (GCM).

Data integrity circuitry 204 may perform error detection and correction based on one or more of a variety of techniques such as, without limitation, error correction code (ECC), parity, cyclic redundancy check (CRC), forward error correction (FEC), hash, and/or checksum. Data integrity circuitry 204 may generate associated integrity metadata 210, which may include, without limitation, an error correction codes (ECC) and/or parity data/bits. Data integrity circuitry 204 may compute or generate integrity metadata 210 based on dataset 106 (e.g., prior to encryption) and/or processed dataset 114 (e.g., subsequent to encryption).

Cryptographic circuitry 202 and data integrity circuitry 204 may operate in an in-line or pipeline fashion.

A portion 212 of block 130 may be reserved, or may be used for increased encryption security.

At 404, memory interface circuitry 118 writes block 130 to memory cells 120. Memory interface circuitry 118 may write a first portion of block 130 to memory cells 120 in a first write operation and may write a remaining portion of block 130 to memory cells 120 in a second write operation. In FIG. 2, memory interface circuitry 118 writes processed (e.g., encrypted) dataset 114, cryptographic metadata 208, and integrity metadata 210 to memory cells 120.

Memory interface circuitry 118 may access memory cells 120 in segments 134 of i bytes, where i is a positive integer. Memory interface circuitry 118 may access memory cells 120 in bursts, and a segment 134 may represent the amount of data accessed in a burst access operation. In the example of FIG. 1, block 130 spans segment 134-1 and a portion of segment 134-2. In this example, block 130 spans (n+m) segments 134, where n is a positive integer and m is a fraction.

Figure 4B:
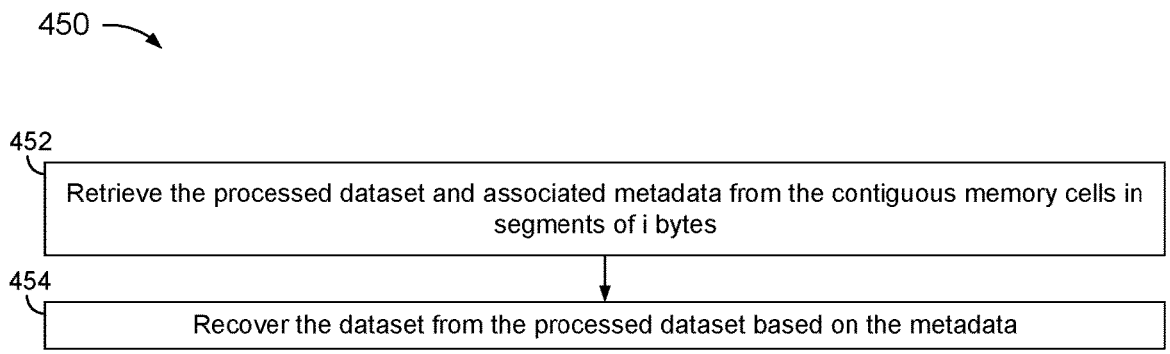
FIG. 4B is a flowchart of a method of reading memory, according to an embodiment.

FIG. 4B is a flowchart of a method 450 of reading memory, according to an embodiment. Method 450 is described below with reference to memory system 100. Method 400 is not, however, limited to the example of memory system 100.

At 452, memory interface circuitry 118 retrieves block 130 from memory cells 120 (e.g., based on a read request). Memory interface circuitry 118 and/or data processing circuitry 104 may temporarily store processed dataset 114, cryptographic metadata 208, and/or integrity metadata 210 in local memory 206.

Memory interface circuitry 118 may read block 130 in segments of i bytes. Memory interface circuitry 118 may, for example, read segment 134-1, containing processed dataset 114, in a first write operation, and may read segment 134-2, containing metadata 116, in a second write operation.

At 454, data processing circuitry 104 recovers dataset 106 from processed dataset 114 based on metadata 116. In FIG. 2, data integrity circuitry 204 determines and/or corrects an integrity of processed dataset 114 based on integrity metadata 210 (e.g., based on an ECC), and cryptographic circuitry 202 decrypts processed dataset 114 based on cryptographic metadata 208.

Write and read operations, such as disclosed above with respect to methods 400 and 450, may be performed independent of one another (e.g., in response to requests from different requesters/devices and/or separate in time). For example, and without limitation, a read operation (e.g., method 450), may be performed subsequent to a write operation (e.g., method 400), and may be performed immediately after the write operation and/or at a later time, by a same requestor or a different requestor.

Figure 5:
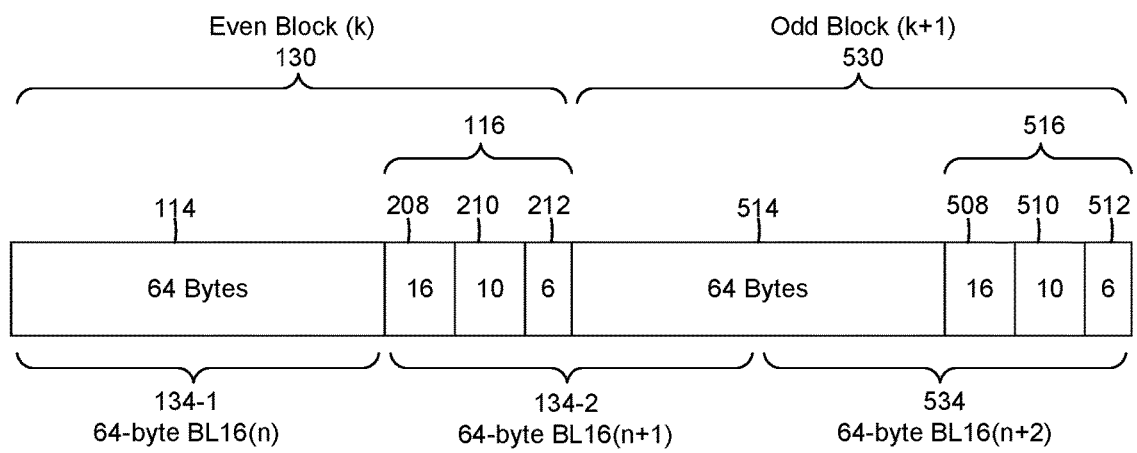
FIG. 5 is a conceptual illustration of data blocks with example parameters, according to an embodiment.

FIG. 5 is a conceptual illustration of data block 130, a data block 530, and example parameters, according to an embodiment. Data block 530 includes processed data 514 and associated metadata 516. Processed data 514 may represent an encrypted version of a dataset 506. In the example of FIG. 5, blocks 130 and 530 are 96-bytes. Blocks 130 and 530 are 96-byte-aligned. Block 130 is also 64-byte aligned. Block 130 has even alignment and block 530 has odd alignment.

Further in the example of FIG. 5, block 130 includes 64 bytes of processed (e.g., encrypted) dataset 114, 16 bytes of cryptographic metadata 208, 10 bytes of integrity metadata 210 (e.g., ECC), and 6 bytes of spare storage in portion 212. In example of FIG. 5, processed dataset 114 consumes ⅔ of block 130, and associated metadata 116 consumes the remaining ⅓ of block 130. Block 530 may have similar parameters.

Memory interface circuitry 118 may access block 130 in memory cells 120 in two segments. 134-1 and 134-2, with two burst length 16 (BL16) access commands. The first BL16 access command accesses the first 64 bytes of block 130 (i.e., processed dataset 114). The second BL16 access command accesses the remaining 32 bytes of block 130 (i.e., metadata 116) and the first 32 bytes of block 530 (i.e., the first 32 bytes of processed dataset 516). In other words, the two BL16 access commands access all 96 bytes of block 130 and the first 32 bytes of block 530, a total of 128 bytes of memory cells 120.

Without cache 302 (FIG. 3), memory access control circuitry 102 may discard the extra 32 bytes of block 530, which may contribute to a lower user-visible bandwidth. With cache 302, memory access control circuitry 102 may retain the extra 32 bytes of block 530. If the access pattern is linear, memory interface circuitry 118 may execute a third BL16 access command to access the remaining 64 bytes of block 530 (i.e., segment 534). The operations count will thus be reduced from 2 operations per block to 1.5 operations per block. Cache operation may differ between read and write operations, such as described below with reference to FIGS. 6 and 7.

A capacity of cacheline 304 may be equal to a difference between a size of block 130 and size of segments 134 accessible by memory interface circuitry 118. For the example of FIG. 5, where block 130 is 96 bytes and memory interface circuitry 118 accesses memory cells 120 in 64-byte segments, cacheline 304 may have a capacity of 32 bytes (i.e., ⅓ the size of block 130 or % the size of segments 134, 534).

The foregoing example parameters are provided for illustrative purposes. Methods and systems disclosed herein are not limited to the foregoing example parameters.

Figure 6:
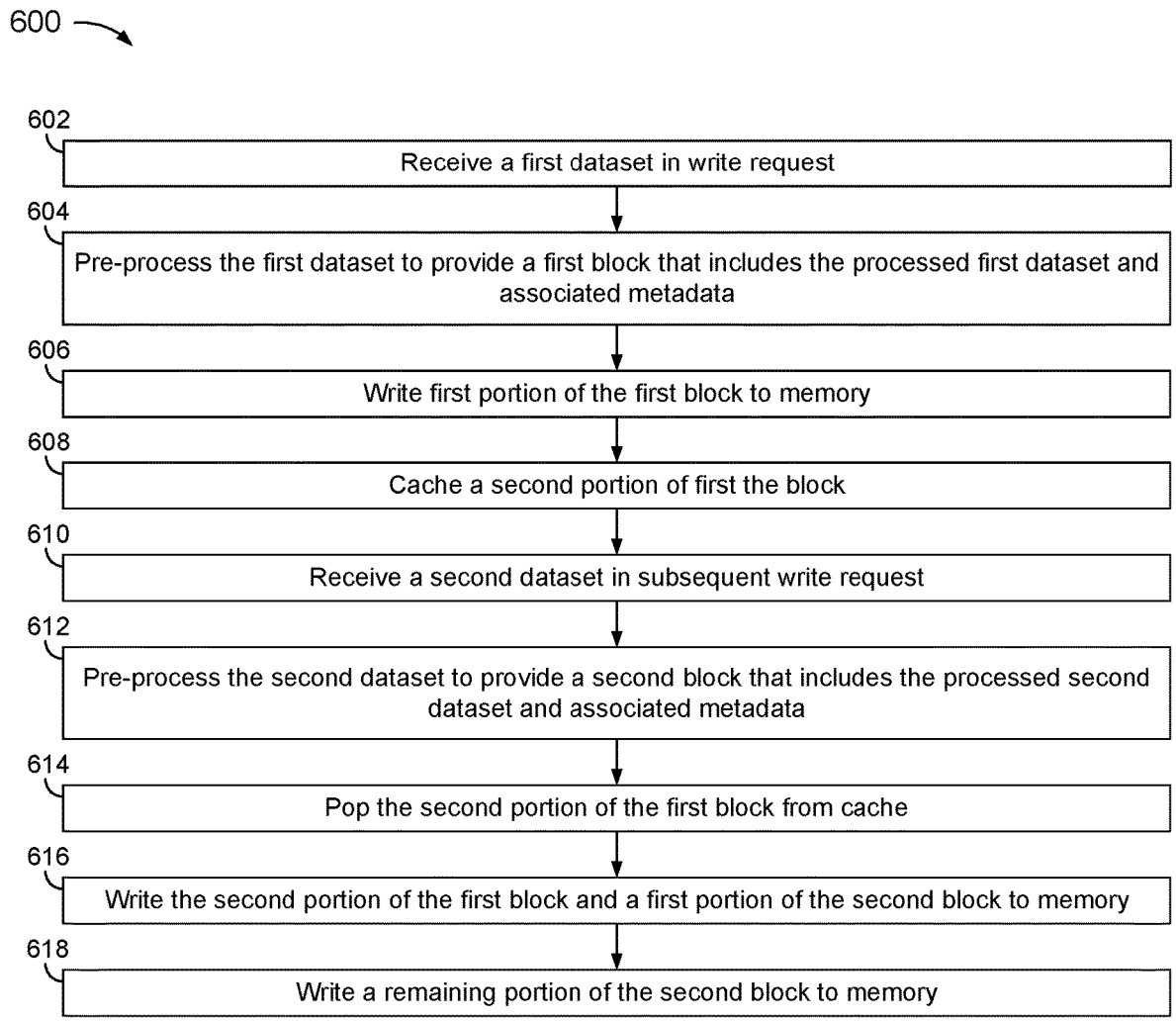
FIG. 6 is a flowchart of a method of performing a sequence of linear write operations, according to an embodiment.

FIG. 6 is a flowchart of a method 600 of performing a sequence of linear write operations, according to an embodiment. Method 600 is described below with reference to memory system 100 and example parameters of FIG. 5. Method 600 is not, however, limited to the example of memory system 100 or example parameters of FIG. 5.

At 602, memory access control circuitry 102 receives a write request that includes 64 bytes of user data (e.g., dataset 106).

At 604, data processing circuitry 104 processes dataset 106 to provide a 96-byte block 130 that includes 64-bytes of encrypted user data (i.e., encrypted dataset 114) and 32 bytes of associated metadata 116 (i.e., 16 bytes of cryptographic metadata 208, 10 bytes of integrity metadata 210, and 6 spare bytes in portion 212).

At 606, memory interface circuitry 118 writes the first 64 bytes of block 130 (i.e., segment 134-1 containing the 64-byte processed dataset 114) to memory cells 120 with a first BL16 write command.

At 608, memory access control circuitry 102 caches a remaining portion of block 130 (i.e., 32-byte metadata 116) in cacheline 304.

At 610, memory access control circuitry 102 receives a subsequent write request that includes 64 bytes of user data (i.e., dataset 506).

At 612, data processing circuitry 104 processes dataset 506 to provide a 96-byte block 530 that includes 64-bytes of encrypted user data (i.e., encrypted dataset 514) and 32 bytes of associated metadata 516.

At 614, memory access control circuitry 102 pops the 32-byte metadata 116 from cacheline 304.

At 616, memory interface circuitry 118 writes segment 134-2 containing the 32-byte metadata 116 and the first 32 bytes of block 530 (i.e., the first 32 bytes of processed dataset 514) to memory cells 120 with a second BL16 write command.

At 618, memory interface circuitry 118 writes the remaining portion of block 530 (i.e., segment 534 containing the remaining 32 bytes of processed dataset 514 and the 32-byte metadata 516) to memory cells 120 with a third BL16 write command.

Figure 7:
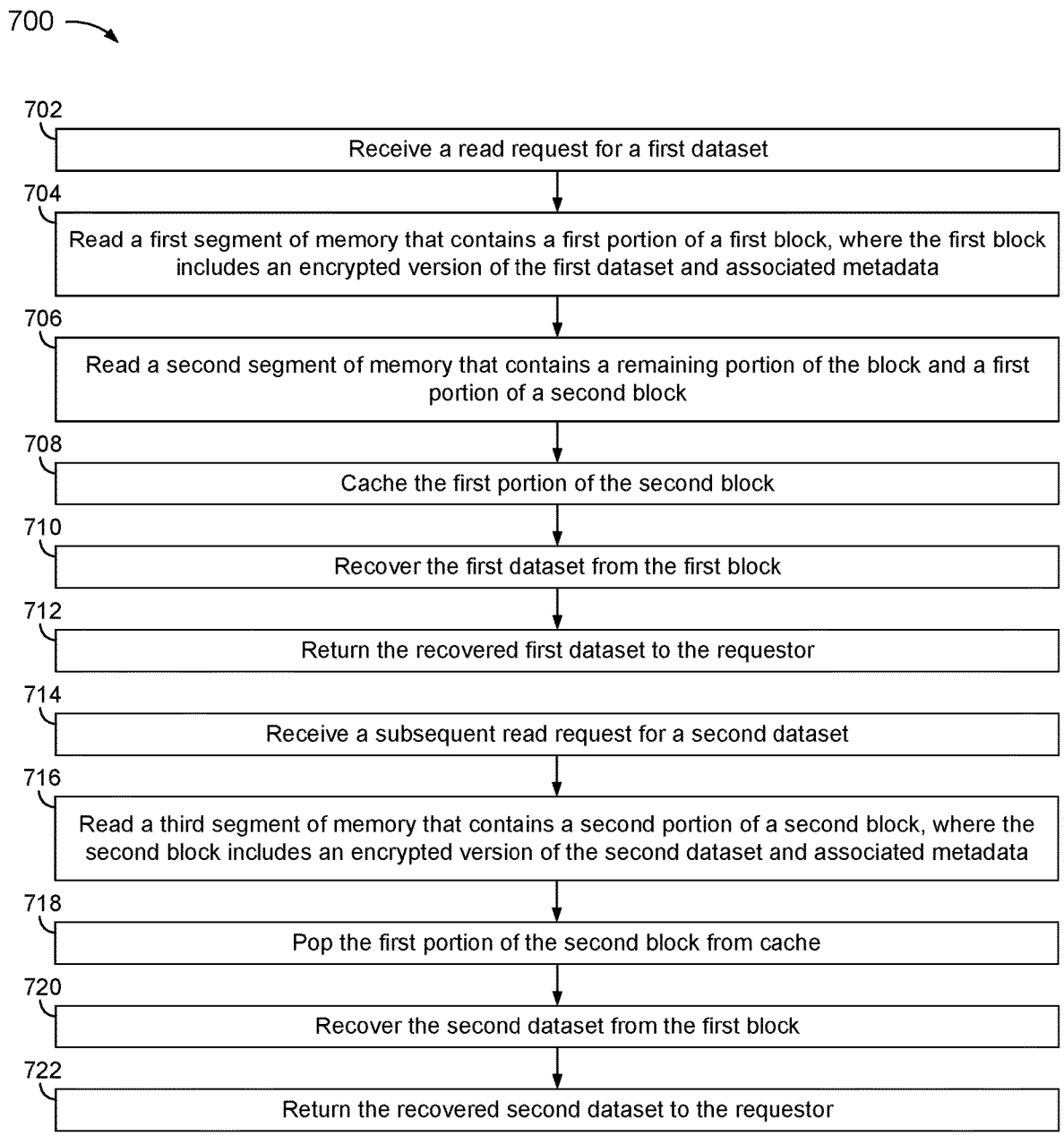
FIG. 7 is a flowchart of a method of performing a sequence of linear read operations, according to an embodiment.

FIG. 7 is a flowchart of a method 700 of performing a sequence of linear read operations, according to an embodiment. Method 700 is described below with reference to memory system 100 and example parameters of FIG. 5. Method 700 is not, however, limited to the example of memory system 100 or example parameters of FIG. 5.

At 702, memory access control circuitry 102 receives a read request for dataset 106.

At 704, memory interface circuitry 118 reads the first 64 bytes of block 130 (i.e., segment 134-1 containing the 64-byte processed dataset 114) from memory cells 120 with a first BL16 read command.

At 706, memory interface circuitry 118 reads segment 134-2 containing the remaining 32 bytes of block 130 (i.e., metadata 116) and the first 32 bytes of block 530 from memory cells 120 with a second BL16 read command.

At 708, memory access control circuitry 102 caches the first 32 bytes of block 530 in cacheline 304.

At 710, data processing circuitry 104 recovers the 64-byte dataset 106 from the 64-byte processed dataset 114 based on the 32-byte metadata 116 (e.g., by performing error correction and decryption).

At 712, memory access control circuitry 102 returns the recovered 64-byte dataset 106 to the requestor.

At 714, memory access control circuitry 102 receives a subsequent read request for dataset 506.

At 716, memory interface circuitry 118 reads segment 534 containing the remaining 64 bytes of block 530 (i.e., the remaining 32 bytes of processed dataset 514 and the 32-byte metadata 516) from memory cells 120 with a third BL16 read command.

At 718, memory access control circuitry 102 pops the first 32 bytes of block 530 (i.e., the first 32 bytes of processed dataset 514) from cacheline 304.

At 720, data processing circuitry 104 recovers the 64-byte dataset 506 from the 64-byte processed dataset 514 based on the 32-byte metadata 516 (e.g., by performing error correction and decryption).

At 722, memory access control circuitry 102 returns the recovered 64-byte dataset 506 to the requestor.

As illustrated in FIG. 5, memory access and control circuitry 102 organizes data as a tightly packed sequence of blocks (e.g., 130 and 530, stored in contiguous memory cells or same page memory cells), with each block containing user data, cryptographic metadata, and ECC. Such a data organization scheme may result in fewer memory access commands per user command for one or more of a variety of traffic patterns and more efficient memory access due to data locality (e.g., same page access in many situations). These benefits may directly translate to higher user-visible bandwidth and lower power consumption by memory cells 120.

For example, in an alternative architecture, encryption and data integrity checking are performed separately, with respective mappings of extra data (e.g., 208 and 210) to be stored in memory (e.g., encryption metadata and EEC syndromes stored separate from one another and separate from associated encrypted user data). In such an alternative architecture, memory access control circuitry may need at least three write or read operations to access user data and associated metadata. Whereas, memory interface circuitry 118 may write processed dataset 114, cryptographic metadata 208, and integrity metadata 210 in two segments 134-1 and 134-2, using two write operations. For linear memory accessing, the savings may be greater (e.g., 1.5 operations per block).

Memory system 100 may be part of an integrated circuit (IC) device such as, for example and without limitation, an IC die or chip, a family of IC devices, a field programmable gate array (FPGA), a system-on-a-chip (SoC), and/or combinations thereof. Memory system 100 may interface with a memory access requestor (e.g., requestor circuitry, a device, and/or an application executing on a processor) through a network-on-chip (NoC).

Figure 8:
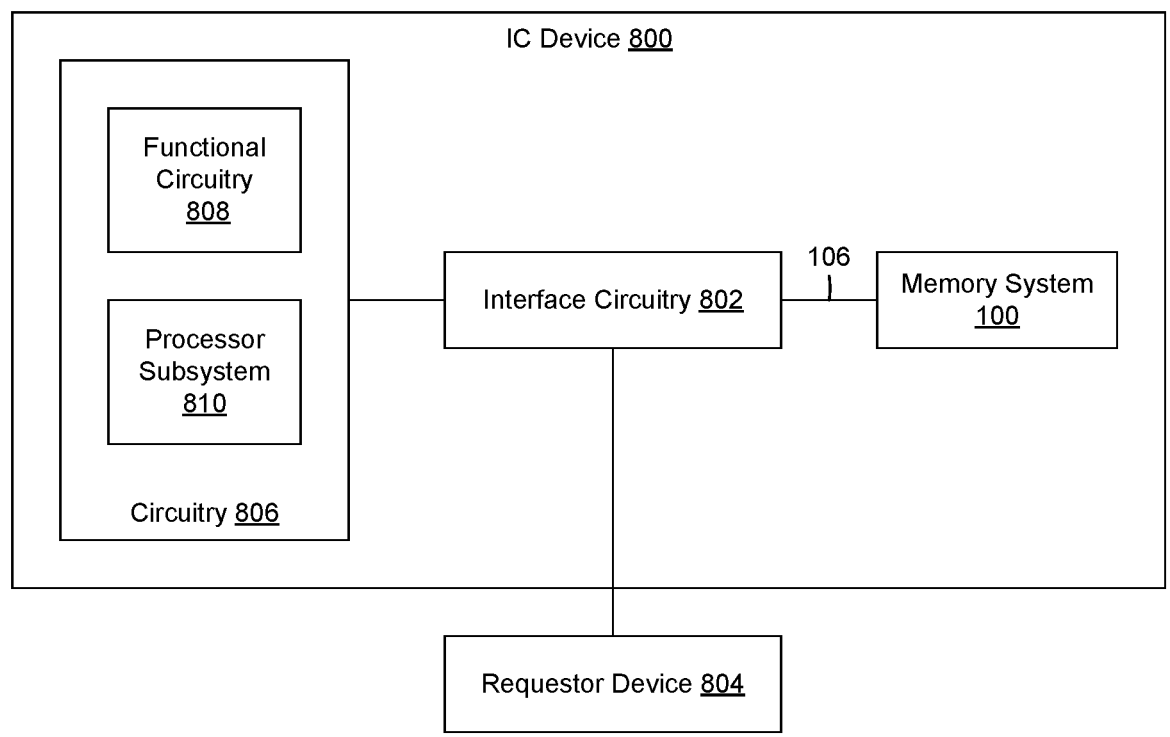
FIG. 8 is a block diagram of an integrated circuit (IC) device that includes the memory system, according to an embodiment.

FIG. 8 is a block diagram of an IC device 800 that includes memory system 100, according to an embodiment. IC device 800 further includes interface circuitry 802 that interfaces between memory system 100 and a requestor to provide dataset 106 to memory system 100 as part of a write request and/or to return dataset 106 to a requestor in response to a read request. Interface circuitry 802 may include, for example and without limitation, network-on-chip (NoC) circuitry that permits requestors and memory system 100 to interface with one another over a packet-switched network.

Interface circuitry 802 may interface between memory subsystem 100 and an off-chip requestor device 804 and/or on-chip circuitry 806, which may include functional circuitry 808 and/or a processor subsystem 810. Functional circuitry 808 may include fixed-function circuitry (e.g., non-configurable logic circuitry) and/or configurable circuitry, also referred to herein a programmable logic (PL). Processor subsystem 810 may include a processor that executes instructions (e.g., instructions of an application program and/or firmware-based instructions).

Table 1 below summarizes number of read operations for various read traffic patterns with respect to architectures disclosed herein and an alternative architecture in which encryption and data integrity checking are performed separately, with respective mappings of extra data to be stored in memory. Numbers of write operations may be similar.

TABLE 1

| Operation | Disclosed Architecture | Alternative Architecture |
|---|---|---|
| 64 Byte Random Read | 2 Reads | 4 Reads |
| 128 Byte Random Read | 3 Reads | 5 Reads |
| 256 Byte Random Read | 6 Reads | 7 Reads |
| Linear Read (full reuse) | 1.5 (average) | 1.4 (average) |

A lower operation count does not necessarily directly translate to higher user bandwidth because the user-visible bandwidth is determined by a combination of the number of operations and access efficiency.

Memory system 100 may be configured in compliance with a standard such as, without limitation, a Double Data Rate 5 Synchronous Dynamic Random-Access Memory (DDR5 SDRAM) standard and/or a Low Power Double Data Rate 5 (LPDDR5) standard.

Bus sizes are discussed below. One or more examples herein utilize a burst length of 16, an access granularity of 64 bytes, and a block size (i.e., block 130) of 96 bytes. This may correspond to a x32 DDR5/LPDDR5 bus configuration. When a DRAM bus is x16, access granularity is 32 bytes. For a block size of 96 bytes, each block maps exactly to 3 DRAM BL16 operations. There is no data waste, and no cache is required. In an embodiment, memory system 100 supports x32 and x16 modes. Memory system 100 is not, however, limited to any of the foregoing example parameters or to DDR5 or LPDDR5 standards.

Address mapping/scaling and storage availability is discussed below. In several examples herein, a 64-byte dataset 106 is expanded into a 9-6-byte block 130. For these examples, memory interface circuitry 118 may multiply a system address associated with dataset 106 (e.g., an address provided in a write request), by 1.5 to produce a corresponding address within memory cells 120, Memory interface circuitry 118 may add or subtract a fixed offset from the system address prior to the multiplication. Address remapping may be transparent to a user/requestor. In the foregoing example, ⅔ of memory cells 120 are available for user data (i.e., processed datasets 114 and 514). For example, if memory cells 120 contain 32 GB of DRAM space, 21.333 GB may be available for user data.

Experimental/performance results are presented below. Table 2 provides summaries of performance results for a DDR5×32 embodiment relative to the alternative architecture in which encryption and data integrity checking are performed separately, with respective mappings of extra data to be stored in memory. In Table 2, BW is a bandwidth available for user data (e.g., processed datasets 114 and 514).

TABLE 2

| | |
|---|---|
| Average BW increase | 58.5% |
| Tests with positive increase | 54 of 63 |
| Tests with BW loss | 9 of 63 |
| Tests with ≥50% improvement | 28 of 63 |
| Tests with ≥100% improvement | 9 of 63 |
| Max BW increase | 429% |
| Average BW loss for the 9 BW loss tests | 5% |
| Max BW loss | 8.9% |

Table 3 summarizes results for four example embodiments. Values in Table 3 are percentages (%). The example embodiments provide an average of 58-68% more bandwidth than the alternative architecture described above.

TABLE 3

| | DDR5X32 | DDR5X16 | LPDDR5X32 | LPDDR5X16 |
|---|---|---|---|---|
| Average BW Increase | 58.5 | 63.2 | 60.1 | 60.1 |
| Tests with BW Increase | 85.7 | 82.5 | 91.1 | 91.1 |
| Tests with BW Loss | 14.3 | 18.5 | 8.9 | 8.9 |
| Tests with ≥50% improvement | 44.4 | 39.7 | 39.7 | 39.7 |
| Tests with ≥100% improvement | 14.3 | 23.8 | 23.8 | 23.8 |
| Max BW Increase | 429 | 378 | 378 | 378 |
| Average BW loss (loss tests only) | 5.0 | 4.6 | 4.6 | 4.6 |
| Max BW Loss | 8.9 | 8.7 | 8.7 | 8.7 |

Memory system 100 may utilize one or more other levels of granularity of interleaving user, metadata, and ECO, each with a different tradeoff of performance, cost, and complexity.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An apparatus, comprising:
a memory controller, comprising,
cache memory; and
memory interface circuitry configured to write data blocks to a memory device in segments that are shorter than the data blocks;
wherein a first one of the data blocks comprises one or more segments and a fraction of a segment; and
wherein the memory interface circuitry is further configured to:
write the one or more segments of the first data block to the memory device in respective write operations;
write the fraction of the segment of the first data block in the cache memory;
retrieve the fraction of the segment of the first data block from the cache memory;
write the fraction of the segment of the first data block retrieved from the cache memory, and a fraction of a segment of a second data block, to the memory device in a respective write operation, wherein the fraction of the segment of the first data block and the fraction of the second data block correspond to a segment; and
write a remaining portion of the second data block to the cache memory.

2. The apparatus of claim 1, wherein the memory controller further comprises in-line, pipelined data processing circuitry configured to:
encrypt datasets associated with write requests and compute error correction codes based on the datasets to provide the data blocks, wherein the data blocks comprise encrypted datasets and metadata, and wherein the metadata comprises cryptographic metadata and syndrome metadata.

3. The apparatus of claim 2, wherein:
the memory interface circuitry is further configured to read the data blocks from the memory device in the segments that are shorter than the data blocks; and
the in-line, pipelined data processing circuitry is further configured to decrypt and error-check the data blocks read from the memory device based on the metadata.

4. The apparatus of claim 1, wherein the memory interface circuitry is further configured to:
write the one or more segments of the first data block and the fractions of the segments of the first and second data blocks to contiguous segments of the memory device.

5. The apparatus of claim 1, wherein the memory interface circuitry is further configured to:
write the remaining portion of the second data block from the cache memory to the memory device in the segment;
read the one or more segments of the first data block from the memory device in one or more respective read operations;
read the fraction of the segment of the first data block and the fraction of the segment of the second data block from the memory device in a subsequent read operation; and
discard the fraction of the segment of the second data block read in the subsequent read operation.

6. The apparatus of claim 1, wherein the memory interface circuitry is further configured to:
write the remaining portion of the second data block from the cache memory to the memory device in segments;
read the one or more segments of the first data block from the memory device in one or more respective read operations;
read the fraction of the segment of the first data block and the fraction of the segment of the second data block from the memory device in a subsequent read operation;
cache the fraction of the segment of the second data block read in the subsequent read operation; and
read the remaining portion of the second data block from the memory device in segments.

7. The apparatus of claim 1, wherein the first data block spans n segments and a fraction of a segment of the memory device, wherein n is a positive integer greater than 1, and wherein the memory interface circuitry is further configured to:
write a first one of the n segments of the first data block to the first segment of the memory device in the first write operation;

store remaining ones of the n segments and the fraction of the segment of the first data block in the cache memory;

write the remaining ones of the n segments of the first data block from the cache memory to respective segments of the memory device in respective subsequent write operations;

receive a second data block from the data processing circuitry;

write the fraction of the segment of the first data block from the cache, and a fraction of a segment of the second data block to a respective segment of the memory device; and cache a remaining portion of the second data block in the cache memory.

8. The apparatus of claim 7, wherein the memory interface circuitry is further configured to:

read the first data block from the memory device in (n+1) read operations; and discard a portion of the (n+1)th read operation that is not part of the first data block.

9. An integrated circuit (IC) device, comprising:
a memory device comprising memory cells; and
a memory controller comprising:
  cache memory; and
  memory interface circuitry configured to write data blocks to a memory device in segments that are shorter than the data blocks;
wherein a first one of the data blocks comprises one or more segments and a fraction of a segment; and
wherein the memory interface circuitry is further configured to:
  write the one or more segments of the first data block to the memory device in respective write operations;
  write the fraction of the segment of the first data block in the cache memory;
  retrieve the fraction of the segment of the first data block from the cache memory;
  write the fraction of the segment of the first data block retrieved from the cache memory, and a fraction of a segment of a second data block, to the memory device in a respective write operation, wherein the fraction of the segment of the first data block and the fraction of the second data block correspond to a segment; and
  write a remaining portion of the second data block to the cache memory.

10. The IC device of claim 9, wherein the memory interface circuitry is further configured to read the data blocks from the memory device in the segments that are shorter than the data blocks, and wherein the memory controller further comprises in-line, pipelined data processing circuitry configured to:

encrypt datasets associated with write requests and compute error correction codes based on the datasets to provide the data blocks, wherein the data blocks comprise encrypted datasets and metadata, and wherein the metadata comprises cryptographic metadata and syndrome metadata; and decrypt and error-check the data blocks read from the memory device based on the metadata.

11. The IC device of claim 9, wherein the memory interface circuitry is further configured to:

retrieve the fraction of the segment of the first data block from the cache memory;

write the fraction of the segment of the first data block and a fraction of a segment of a second one of the data blocks to the memory device in the subsequent write operation; and write a remaining portion of the second data block to the cache memory.

12. The IC device of claim 11, wherein the memory interface circuitry is further configured to:

write the remaining portion of the second data block from the cache memory to the memory device in segments;

read the one or more segments of the first data block from the memory device in one or more respective read operations;

read the fraction of the segment of the first data block and the fraction of the segment of the second data block from the memory device in a subsequent read operation; and discard the first segment of the second data block read in the subsequent read operation.

13. The IC device of claim 11, wherein the memory interface circuitry is further configured to:

write the remaining portion of the second data block from the cache memory to the memory device in segments;

read the one or more segments of the first data block from the memory device in one or more respective read operations;

read the fraction of the segment of the first data block and the fraction of the segment of the second data block from the memory device in a subsequent operation;

cache the fraction of the segment of the second data block read in the subsequent read operation; and read the remaining portion of the second data block from the memory device in segments.

14. A method, comprising:
writing data blocks to a memory device in segments that are shorter than the data blocks, wherein a first one of the data blocks comprises one or more segments and a fraction of a segment, and wherein the writing comprises,
  writing the one or more segments of the first data block to the memory device in respective write operations,
  writing the fraction of the segment of the first data block in the cache memory, and
  writing the fraction of the segment of the first data block from the cache memory and a fraction of a second data block to the memory device in a subsequent write operation, wherein the fraction of the segment of the first data block and the fraction of the second data block correspond to a segment; and
  writing a remaining portion of the second data block to the cache memory.

15. The method of claim 14, further comprising:
encrypting datasets and computing error correction codes based on the data sets to provide the data blocks, wherein the data blocks comprise encrypted datasets and metadata, and wherein the metadata comprises cryptographic metadata and syndrome metadata.

16. The method of claim 15, further comprising:
reading the data blocks from the memory device in the segments that are shorter than the data blocks; and
decrypting and error correcting the data blocks read from the memory device based on the metadata.

17. The method of claim 14, further comprising:
writing the remaining portion of the second data block from the cache memory to the memory device in the segments;

reading the one or more segments of the first data block from the memory device in respective read operations;

reading the fraction of the segment of the first data block and the fraction of the segment of the second data block from the memory device in a subsequent read operation; and discarding the fraction of the segment of the second data block read in the subsequent read operation.

18. The method of claim 14, further comprising:

writing the remaining portion of the second data block from the cache memory to the memory device in the segments;

reading the one or more segments of the first data block from the memory device in respective read operations;

reading the fraction of the segment of the first data block and the fraction of the segment of the second data block from the memory device in a subsequent read operation;

caching the fraction of the segment of the second data block read in the subsequent read operation; and reading the segments of the remaining portion of the second data block from the memory device in respective subsequent read operations.

\* \* \* \* \*